June 2, 1970 N. M. POOLE 3,514,962
SUBMERSIBLE PIPE LAYING BARGES
Filed Oct. 8, 1968
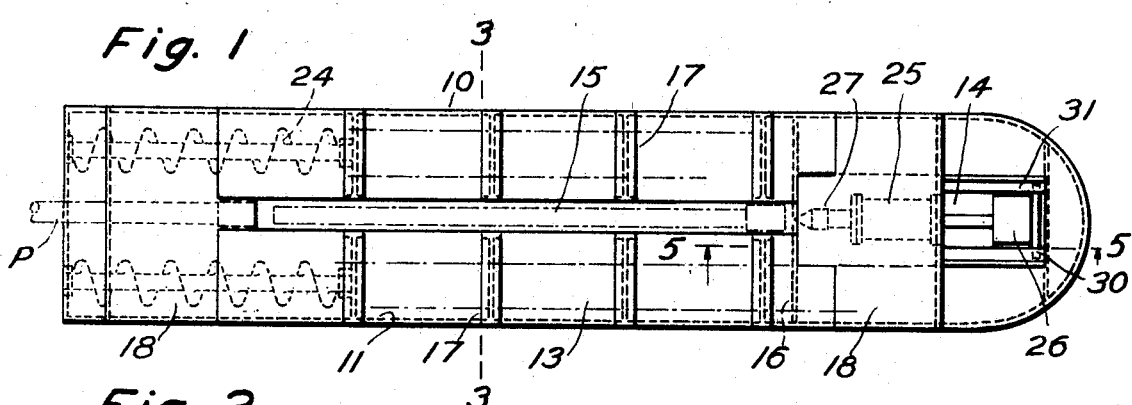
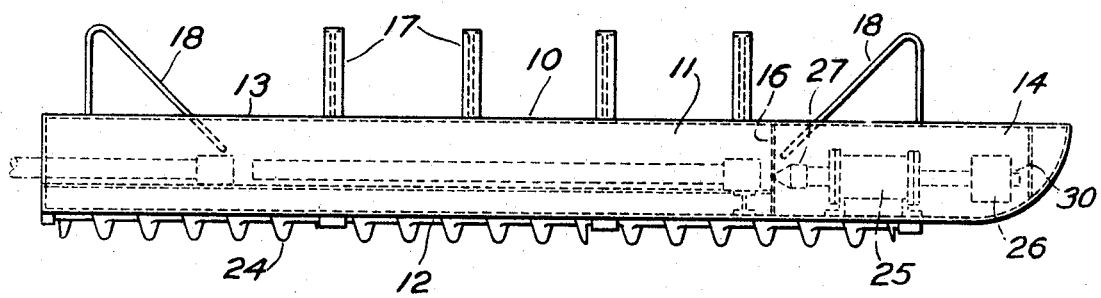
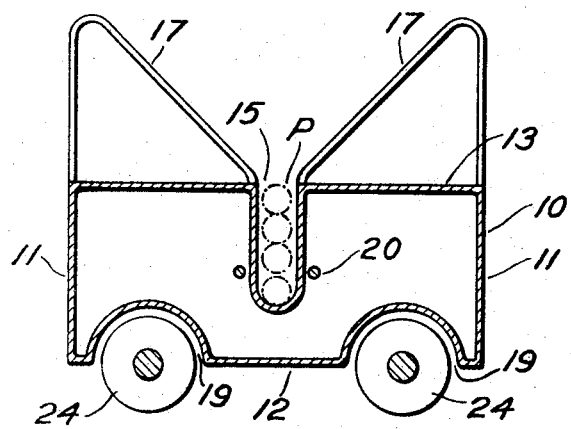
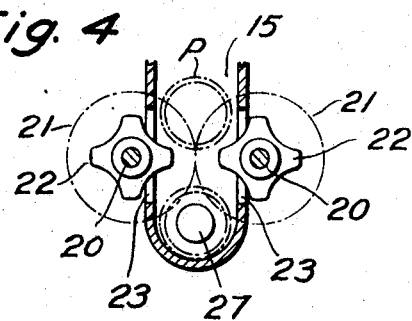
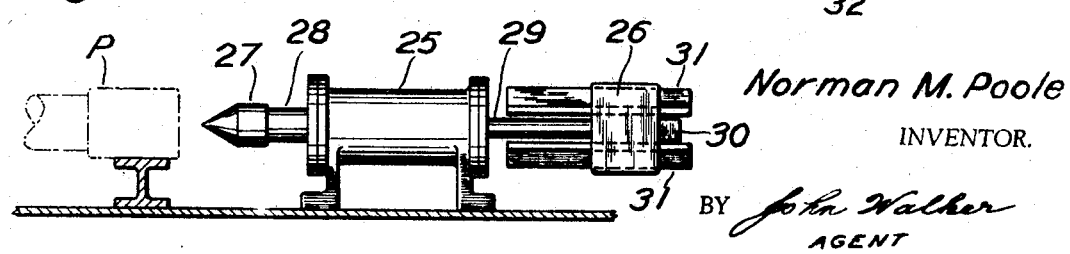
Norman M. Poole
INVENTOR.
BY John Walker
AGENT ns Patent Office 3,514,962
Patented June 2, 1970

3,514,962
SUBMERSIBLE PIPE LAYING BARGES
Norman M. Poole, Lafayette, Calif.
(16694 Maple St., Fountain Valley, Calif. 92708)
Filed Oct. 8, 1968, Ser. No. 765,769
Int. Cl. F16l 1/00; B25j 5/00
U.S. Cl. 61—72.3
6 Claims

ABSTRACT OF THE DISCLOSURE

A surface controlled, submersible, barge type pipe laying vessel adapted to automatically feed, align and connect successive sections of threaded and coupled steel pipe, the vessel being adapted to reposition itself at the completion of each cycle of operations.

---

This invention relates to submarine pipe laying equipment, and more particularly to a submersible type vessel adapted to the feeding, alignment and connection of successive lengths of pipe having threaded coupling means.

The task of laying submarine pipe lines has always been one which has presented almost insurmountable difficulties in its accomplishment. Many factors contribute to this condition. Depth of water, weather and tide, water surface roughness and uneven sea bed are all conditions which make the laying of submarine pipe lines an extremely hazardous, time consuming and costly undertaking. This is described in some detail in U.S. Pats. 3,204,417 and 3,267,682. The devices disclosed by these patents, however, relate to the laying of pipe of the bell and spigot type. Where it becomes necessary to install steel pipe, other problems are presented. One method of laying metal pipe is disclosed by U.S. Pat. 3,372,461, the individual lengths of pipe being connected by means of welding.

It is the principal object of the present invention to provide a means of laying steel pipe in sections which are connected by threaded couplings.

It is a further object of the invention to provide a means of simplifying the alignment of the successive lengths of pipe.

A still further object of the invention is the provision of a device adapted to the loading of a plurality of lengths of pipe and to the automatic release of individual sections as required.

Yet another object of the invention is the provision of a submersible barge which can be readily manipulated on the bed of a body of water in order to position it so as to maintain alignment with the work as it progresses.

These and other objects of the invention will become apparent during the course of the following description and appended claims, taken in connection with the accompanying drawing forming a part hereof, and in which:

FIG. 1 is a deck plan view of a preferred embodiment of my pipe laying vessel.

FIG. 2 is a side elevation of the barge shown on FIG. 1.

FIG. 3 is an enlarged, typical vertical transverse section taken at one of the pipe guides such as at line 3—3 of FIG. 1.

FIG. 4 is an enlarged detail of a suggested form of pipe releasing mechanism.

FIG. 5 is an enlarged side elevation of the pipe connecting mechanism as viewed from line 5—5 on FIG. 1.

FIG. 6 is an enlarged fragmentary view illustrating an alternate method of barge propulsion.

Directing attention to the drawing in detail, my invention is described with reference thereto, and under the following sub-headings:

BARGE HULL

The barge hull 10, is a fabricated steel structure having a rounded bow or forward end, and a square stern. The forward end is formed as illustrated in order to present a minimum of resistance to the movement of the hull through marine growth. In its simplest, elementary form, the hull 10 is, for the major portion of its length, in the shape of a hollow rectangular prism having vertical sides 11, a substantially flat bottom 12, and a flat upper deck 13. A well, 14 is located closely adjacent the prow of the hull for the reception of the pipe securing mechanism hereinafter described.

For the larger portion of its length, the deck 13 is longitudinally and centrally divided by a vertical slot or recess 15, which extends from the stern of the vessel to a transverse bulkhead 16, the said slot being open at each end. The width of the slot 15 is slightly larger than the maximum diameter of the pipe and fittings P it is designed to accommodate. It is of semicircular, concave configuration at the bottom thereof as can be seen by reference to FIG. 3. The bulkhead 16 also serves as one of the transverse walls of the well 14.

A plurality of upstanding spaced pairs of laterally-aligning pipe guide members 17, extend transversely across the deck 13, being formed with downwardly converging inner guide faces which terminate at, and are flush with, the top of the vertical walls of the pipe receiving slot 15. These guide members are symmetrically arranged with reference to the slot 15; see FIG. 3.

End guide members 18 are also provided to ensure the correct positioning of the pipe lengths relative to the pipe securing mechanism, and a previously installed length of pipe.

With further reference to FIG. 3, it will be noted that a pair of symmetrically arranged, semicircular channels or recesses 19 have been provided in the barge bottom 19, for the reception of the propulsion mechanism as will be further described. In the present embodiment of the invention, the channels 19 extend almost the entire length of the shell, the prow of the barge remaining of undisturbed, parti-spheroidal configuration, for the reason stated heretofore.

While, for the purpose of this disclosure, the hull 10 has been illustrated and described as a comparatively empty hollow shell, it will be understood that ballast tanks, machinery compartments, and other features will be provided which are essential to the complete and efficient operation of the device.

PIPE RELEASING MECHANISM

Reference being made to FIG. 4, a cross section of the lower portion of the recess 15 has been indicated thereon. A pair of shafts 20 are rotatably mounted, one on each side of the outer walls of said recess, the shafts being operatively connected at one end thereof by a pair of identical gears 21. One of these shafts will be connected to a power source, not indicated, for operation of the mechanism. Star wheels, or release cams 22 are fixedly mounted in transversely aligned and paired relationship on the shafts 20, being of such number and spacing as dictated by design considerations. An initial design would contemplate the installation of a pair of cams closely adjacent each of the guide members 17, with the exception of the extreme forward member. Apertures 23 are provided in the vertical walls of the recess 15 to allow for the installation of the wheels or cams 22.

It will be apparent from the illustration of FIG. 4 that, with the wheels 22 in the position indicated, any length of pipe P above the wheels will be prevented from falling into the bottom of the recess. It will also be obvious, that when a section of pipe has been removed from the bottom of the recess, a quarter turn of the wheels 22 will release one section of pipe and allow it to fall while retaining additional lengths in the upper levels. In the actual reduction to practice, it may be found that only one of the said shafts with the mounted wheels may be required. It should also be understood that other types of releasing mechanism may be adopted, such departures from the disclosed design being considered as mechanical equivalents.

PROPULSION MECHANISM

In the laying of a pipe line, it will be necessary that the barge be moved ahead a predetermined distance at each completion of installation of an individual length of pipe. In order to accomplish this repositioning movement, helical screws 24, of auger like or conventional conveyer screw form have been provided. These screws are rotatably mounted within the semicircular recesses 19 as indicated. They will comprise two parallel rows of axially aligned, individual screws, symmetrically arranged with reference to the barge median line. They will be individually powered, and will be of a quantity found to be most expedient for the size of the barge being considered, and for any further design criteria involved.

The screws will be arranged with opposite hand helices on opposite sides of the vessel to preclude any slewing action that would otherwise take place. Means of varying the speed of rotation of the continuous rows of screws on each side of the barge will be provided, in order to facilitate the guiding of the craft.

PIPE SECURING MECHANISM

After a length of pipe has been released into the bottom of the recess 15, it must then be brought into engagement with the previously installed length, and rotated in order that the threaded end may be firmly secured into the mating coupling. This dual operation is accomplished by means of the assembly illustrated on FIG. 5, and comprises a hydraulic cylinder 25, hydraulic motor 26, and an expanding plug type arbor 27.

The cylinder 26 is of the double acting type and is provided with two piston rods. A rod 28 extends rearwardly and has the arbor 27 mounted on the outer end thereof. A forwardly extending rod 29 is coupled to the motor 26, and is adapted to be driven thereby. The motor is prevented from reactive rotation by a bar 30, extending across the rear of the motor housing, the ends of said bar being restrained within guides 31 as illustrated. The guides are secured to the walls of the well 14, and are adapted to maintain the alignment of the complete assembly.

Pressure introduced at the forward end of the cylinder 25 will cause the arbor to enter the interior of the pipe P, the motor 26 sliding between the guides 31 as the piston of the motor makes its stroke. The arbor will then be expanded and will push the pipe to which it is attached, into engagement with the previously laid length. Rotation of the piston rods and arbor assembly, by means of the motor 26, will then bring about the union of the male and female threads of the pipe and coupling respectively. Tightening of the joint will build up the torque on the motor to a point where it will automatically release the arbor, and the unit will be retracted in readiness for the next cycle.

Again it should be understood that the illustration and description of a particular design of apparatus is not to be considered to be restrictive to any degree. The pipe-engaging element could be a chuck adapted to grip the pipe externally. Also, the motor could be in a fixed position and be coupled to the piston by means of telescoping, splined shafts.

ALTERNATE PROPULSION MECHANISM

Under certain conditions, where a screw type propulsion system may not be suitable, it is proposed to move the barge by means of caterpillar treads as shown on FIG. 6. This assembly will follow conventional design, comprising driving sprocket 32, track 33, load bearing rollers 34, and the other components in accordance with accepted practice. The caterpillar treads will be installed in multiple, similar to the screw type design, and will be controlled in like manner.

OPERATION

The various steps of putting my barge into operation will comprise the loading of the pipe sections into the space within the guide members, and, as can be seen on FIG. 3, a large number of pipe sections can be loaded above the parallel receiving recess. After the barge has been towed to the site of the work, it will be submerged and brought into position by remote control of its propulsion mechanism. The coupling of the individual sections of pipe will then proceed as heretofore described, the barge being advanced as each section is installed. All of the individual operations will be surface controlled. Additional pipe sections will be lowered onto the barge from surface craft as needed.

From the foregoing it will be apparent that I have provided a means of laying submarine pipe that will greatly expedite such operations, and will eliminate many of the hazards that work of this nature presently entails. While I have disclosed a preferred and basic embodiment of my invention, it should be understood that further modifications and refinements may be made within the spirit and scope of the appended claims.

I claim:

1. An underwater pipe laying apparatus comprising a submersible barge type vessel, a ballast tank contained within the shell of said vessel, adapted to effect complete submergence thereof, a pipe receiving channel extending across the upper surface of said vessel, guide members adapted to funnel individual lengths of pipe into said channel, second guide members adapted to position said pipe longitudinally within said channel, the arrangement of said channel and said guide members being such that an individual length of pipe is positioned in alignment with a previously laid length, power means adapted to advance the aligned length of said pipe in said channel to contact a previously laid length, and power means adapted to rotate said aligned length of pipe in said channel for engagement with said contacting length of pipe in screw threaded relationship.

2. An apparatus as in claim 1 having propulsion means, said propulsion means being adapted to mainpulate said vessel upon the bed of a body of water.

3. An apparatus as in claim 2 wherein said propulsion means comprises a shaft rotatably mounted on the underside of said vessel and being formed with a helical vane.

4. An apparatus as in claim 2 amended wherein said propulsion means comprises a caterpillar tread.

5. An apparatus as in claim 1, wherein said vessel is provided with means adapted to release individual lengths of pipe to said channel.

6. An apparatus as in claim 2 wherein said vessel is provided with means adapted to release individual lengths of pipe to said channel.

References Cited

UNITED STATES PATENTS

| | | | |
|---|---|---|---|
| 1,646,611 | 10/1927 | Code | 180—7 |
| 2,780,376 | 2/1957 | Sanders | 61—72.1 X |
| 3,434,297 | 3/1969 | Gretter et al. | 61—72.4 |

JACOB SHAPIRO, Primary Examiner

U.S. Cl. X.R.

180—7; 214—1